(12) United States Patent
Bernat

(10) Patent No.: US 10,944,644 B2
(45) Date of Patent: Mar. 9, 2021

(54) TECHNOLOGIES FOR THERMAL AND POWER AWARENESS AND MANAGEMENT IN A MULTI-EDGE CLOUD NETWORKING ENVIRONMENT

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/578,314

(22) Filed: Sep. 21, 2019

(65) Prior Publication Data

US 2020/0021502 A1 Jan. 16, 2020

Related U.S. Application Data

(60) Provisional application No. 62/841,042, filed on Apr. 30, 2019.

(51) Int. Cl.
*H04L 12/24* (2006.01)
*G06F 1/28* (2006.01)
*G06F 11/30* (2006.01)

(52) U.S. Cl.
CPC ............ *H04L 41/5003* (2013.01); *G06F 1/28* (2013.01); *G06F 11/3062* (2013.01)

(58) Field of Classification Search
CPC ..... H04L 67/12; H04L 2209/38; H04L 67/10; H04L 9/3239; H04L 41/5003; G06N 3/08; G06N 3/04; G06K 9/00624; G06T 2207/20084; G06F 21/6254; G06F 16/535; G06F 16/538; G06F 16/54; G06F 16/951; G06F 21/44; G06F 1/28; G06F 11/3062; H04W 12/02; H04W 4/70
See application file for complete search history.

(56) References Cited

U.S. PATENT DOCUMENTS

| | | | | |
|---|---|---|---|---|
| 9,705,974 | B2 * | 7/2017 | Reddy | H04L 41/5054 |
| 9,738,125 | B1 * | 8/2017 | Brickley | B60D 1/26 |
| 10,323,878 | B1 * | 6/2019 | Woolf | F25D 13/00 |
| 10,503,942 | B1 * | 12/2019 | Thurston | G06F 11/3058 |
| 2013/0042123 | A1 * | 2/2013 | Smith | G06F 9/5077 |
| | | | | 713/300 |

(Continued)

*Primary Examiner* — Ninos Donabed
(74) *Attorney, Agent, or Firm* — Hanley, Flight & Zimmerman, LLC

(57) ABSTRACT

Technologies for managing Function-as-a-Service function requests based on thermal and power awareness include an edge entity device having a circuitry to receive, from an edge device, a request to execute a function in an edge network environment having a plurality of edge entities. The circuitry is also to evaluate thermal and power criteria associated with the request and determine, as a function of a predicted thermal output over a specified time period relative to thermal and power criteria, whether to execute the function. In response to a determination by the circuitry to not execute the function, the circuitry is to select an edge entity of a plurality of edge entities that is able to satisfy the thermal and power criteria. The circuitry is further to forward the request to the selected edge entity.

13 Claims, 6 Drawing Sheets

(56) References Cited

U.S. PATENT DOCUMENTS

| | | | |
|---|---|---|---|
| 2013/0222515 A1* | 8/2013 | Abuan | H04W 40/12 348/14.01 |
| 2014/0262127 A1* | 9/2014 | Barnes | G06F 1/206 165/11.1 |
| 2014/0266405 A1* | 9/2014 | Barnes | G06F 1/1626 327/513 |
| 2015/0301853 A1* | 10/2015 | Nandyalam | G06F 9/505 718/105 |
| 2017/0149880 A1* | 5/2017 | Lochhead | G06F 9/00 |
| 2017/0149931 A1* | 5/2017 | Lochhead | H04L 41/0896 |
| 2017/0368897 A1* | 12/2017 | Brickley | H04W 4/70 |
| 2018/0136709 A1* | 5/2018 | Jahagirdar | H02J 7/0021 |
| 2018/0157532 A1* | 6/2018 | Kumar | G06F 9/5061 |
| 2018/0287949 A1* | 10/2018 | Kumar | G06F 1/206 |
| 2020/0057479 A1* | 2/2020 | Cher | G06F 1/206 |

* cited by examiner

TECHNOLOGIES FOR THERMAL AND POWER AWARENESS AND MANAGEMENT IN A MULTI-EDGE CLOUD NETWORKING ENVIRONMENT

CROSS-REFERENCE TO RELATED APPLICATION

The present application claims the benefit of U.S. Provisional Patent Application No. 62/841,042, filed Apr. 30, 2019.

BACKGROUND

Edge computing provides techniques for processing resources at a location in closer network proximity to a requesting device, as opposed to a centralized location in a cloud network. Doing so ensures that devices receive critical data relatively quickly. For example, an edge device may include multiple sensors that collect various data, such as image sensor data captured over time. The edge device may transmit the sensor data to the edge network, and edge compute resources in the network further process the sensor data. For instance, the compute resources may aggregate the sensor data with the sensor data of other devices. Continuing the example, the compute resources may analyze the aggregated data to generate a route map in a smart city architecture.

Generally, each component in the edge network is subject to various performance requirements, such as those specified in a service level agreement (SLA), a quality-of-service (QoS) specification, and the like. For example, a QoS requirement may specify that edge device requests are to be serviced under a given latency measure. Further, in some cases, latency associated with a device edge network may be affected by various factors, such as load and thermal constraints, of edge resources in the network. Performance monitors in the edge network may collect telemetry data from each component. Doing so allows orchestrators in the edge network to manage resource allocation and usage accordingly to ensure that the performance requirements are satisfied.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
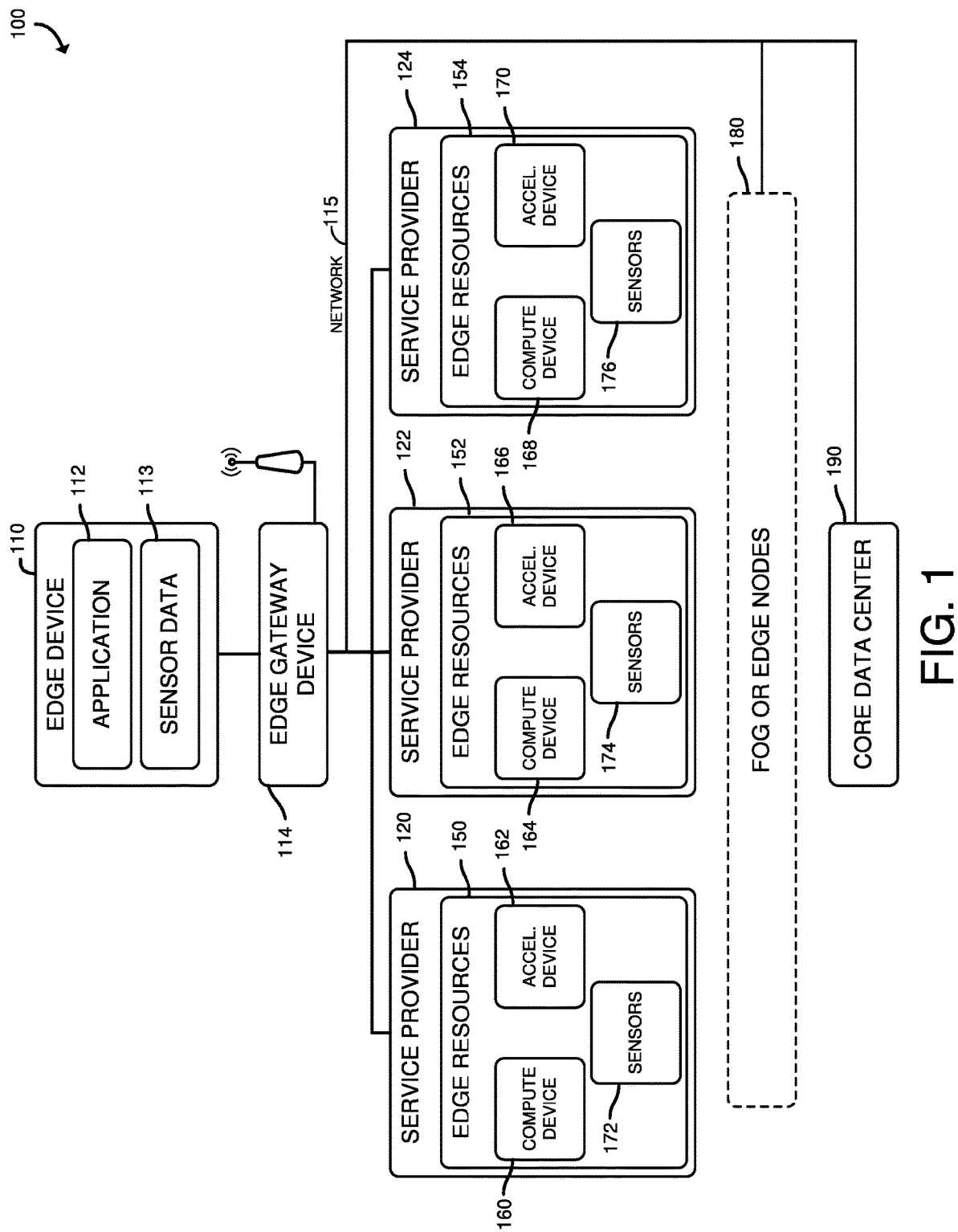
FIG. 1 is a simplified diagram of at least one embodiment of a system for managing edge workloads as a function of thermal constraints across a multi-edge cloud platform.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for managing edge workloads as a function of thermal constraints is shown. The system 100 is representative of an edge platform that may include multiple edge networking environments. Illustratively, the system 100 includes an edge device 110 in communication with an edge gateway device 114. The edge gateway device 114 may be embodied as any device capable of communicating data over a network 115 between the edge device 110 and one or more edge resources 150, 152, 154 (e.g., resources, such as compute devices and the components thereof, owned and/or operated by one or more service providers 120, 122, 124, respectively, such as cellular network operators, each of which may constitute an individual edge network environment) or other compute devices located in one or more edge clouds. The interconnections between the edge gateway device 114 with the other devices over the network 115 may include wireless and wired connections. Further, the edge gateway device 114, in the illustrative embodiment, is configured to receive and respond to requests from the edge device 110 regarding characteristics of the edge resources 150, 152, 154, such as architectures of processors, accelerator devices, and/or other components in the edge resources 150, 152, 154 (e.g., in compute devices 160, 164, 168 and accelerator devices 162, 166, 170), latencies, power usage, and costs (e.g., monetary costs) associated with using those edge resources 150, 152, 154. The edge gateway device 114 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, vehicle-to-vehicle (V2V) or vehicle-to-everything (V2X) communication systems, etc. Further, the system 100 may be organized in a hierarchical structure having multiple tiers. For example, a given tier may include the aforementioned edge computing devices, e.g., edge computing devices in locations that are of a similar network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a further network tier (e.g., edge nodes 180), which may be embodied as a system-level horizontal architecture that distributes resources and services of computing, storage, control and networking anywhere between a core data center 190 (e.g., a data center that is further away from and in a higher level of the hierarchy of the system 100 than the edge resources 150, 152, 154, and that includes multiple compute devices capable of executing one or more services (e.g., processes on behalf of one or more clients)) and an endpoint device (e.g., the edge device 110).

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 150, 152, or 154. Generally, the edge gateway device 114 may receive such requests. The edge gateway device 114 may thereafter evaluate the request and forward the request to an appropriate service at an edge location operated by one of the service providers 120, 122, 124 (or to the edge nodes 180 or core data center 190).

In addition, the edge device 110 may collect sensor data 113 from each of multiple sensors configured with the edge device 110. Continuing the example of an autonomous vehicle, sensors may include Light Detection and Ranging (LIDAR) sensors, global positioning system (GPS) sensors, temperature sensors, and so on. The edge device 110 may transmit sensor data 113 to the edge gateway device 114, which in turn may transmit the sensor data 113 to compute components in the system 100 (e.g., edge resources 150, 152, 154, edge nodes 180, or the core data center 190) for further processing and analytics. In some cases, the edge gateway device 114 aggregates the sensor data 113 from multiple edge devices 110 prior to transmitting the sensor data 113 to the compute components. Further, the edge gateway device 114 may correlate sensor data to various analytics, such as historical analytics (e.g., average temperature collected from a given sensor over time, time periods at which temperature is observed by sensors at a peak value, etc.).

The edge gateway device 110 may communicate with a number of edge entities, e.g., an edge location including a base station, a cell tower, etc., and determine an appropriate destination for FaaS requests. Further, each of the service providers 120, 122, 124 may correspond to an edge entity, such as a telecommunications operator, that owns the respective edge resources 150, 152, 154. In some cases, a service provider 120, 122, 124 may rent out (or otherwise allow ownership or usage of) the respective edge resources 150, 152, 154 (or a partition thereof) to a third-party, also referred to therein as a "tenant." A tenant may correspond to another edge entity, such as a network provider, a cloud services provider, another telecommunications operator, and so on. In some cases, a given set of edge resources may be partitioned among multiple tenants.

Edge entity devices, e.g., devices associate with an edge entity including resource components (e.g., the compute devices and accelerator devices of each of the service providers 120, 122, 124) may be configured with various energy sources, including solar power sources. In such a case, these components may harvest energy that can be used to replenish battery power in the components. In an embodiment, edge entity devices including resource components of the service providers 120, 122, 124 may include ambient sensors 172, 174, 176 to monitor the amount of energy harvested by each of the components. Further, the ambient sensors 172, 174, 176 may obtain thermal readings (e.g., temperature, humidity, etc.) associated with the components. In practice, edge resources may be located in various geographical regions that are subject to different climates. For example, components associated with a given base station may be located outdoors in a relatively temperate environment. To regulate temperature, the components may be configured with a number of cooling resources (e.g., fans) distributed amongst one the components to preserve a given thermal property (e.g., to maintain a temperature at a given level).

Generally, in mapping resources to perform a given Function-as-a-Service (FaaS), power and thermal properties serve as a significant constraint. That is, a given function to be executed may be resource intensive and thus require specialized accelerator devices that themselves require a relatively large amount of power and thermal energy. FaaS services provided by edge resources 150, 152, 154 (e.g., accelerator devices 162, 166, 170 respectively) are often resource intensive, yet are subject to thermal constraints, e.g., temperature, load, and cooling capacity constraints. As stated, components in the edge platform and the services themselves may be required to satisfy SLA and QoS requirements in the edge platform. However, thermal properties must also be observed to ensure that the components do not fail as a result of, e.g., overheating of the resources. Thermal telemetry data may be collected from each of the edge resources to identify a thermal load on the resources. It is desirable to use thermal telemetry data for effective resource allocation and "cost of execution" attribution in a SLA.

In addition, each of the components of the system 100 (e.g., the edge gateway device 114, edge resources 150, 152, 154, edge nodes 180, core data center 190, etc.) may be subject to one or more performance requirements. Such performance requirements may be specified by one or more service level agreements (SLA) or as one or more quality-of-service (QoS) requirements. For example, a QoS requirement may specify a priority for an edge service request to be processed within a given timeframe or that the request is subject to be processed under a given latency. Telemetry data allows an orchestrator (e.g., executing within the edge gateway device 114 or the core data center 190) to analyze workload performance and adjust resource allocation and usage as necessary.

To address this, embodiments presented herein also disclose thermal- and power-aware load balancing SLA and cooling management-based techniques. More specifically, embodiments provide techniques to distribute FaaS function execution between peer edge entities (e.g., across service providers 120, 122, 124 of a given tier) to preserve thermal properties among different edge networking environments. As described further herein, thermal telemetry, such as temperature and humidity, is monitored in edge resource components (e.g., by the ambient sensors 172, 174, 176), such as compute devices 160, 164, 168 and accelerator devices 162, 166, 170. Further, energy properties, such as harvested energy levels and current battery power, are monitored by the ambient sensors 172, 174, 176. In an embodiment, the monitored thermal telemetry and energy properties (e.g., thermal load, historical temperature values, cooling capacity, and so on) may be collected over time to generate a predictive model using various classification and predictive modeling techniques. Doing so allows a given edge entity to estimate thermal properties and energy constraints over a given amount of time (e.g., over an hour, six hours, twenty-four hours, and so on).

Further, each edge entity may also distribute the estimated thermal properties and energy constraints over a given period to one another. Further, each entity may generate a "heat map" that indicates properties such as a location for a given resource, estimated thermal and energy levels for that resource over time, power usage, and so on.

In an embodiment, an edge entity may evaluate its predicted thermal properties and, via the heat map, the predicted thermal properties of other edge entities in function request handling. For example, an edge entity may evaluate its own predicted thermal properties in response to receiving a request to determine whether to execute a function. More particularly, the edge entity may determine whether, over the course of a given time period and relative to its current load, whether the function can be executed thereon and preserve thermal and cooling capacity to execute other functions. In cases where the edge entity determines to not execute the function, the edge entity may identify, by the heat map, another edge entity having thermal capabilities to handle the request. Further, load balancing techniques may be applied across edge entities to ensure that thermal properties are preserved thereacross. For instance, in the event that the edge entity identifies multiple other entities having thermal capabilities suited for executing a FaaS function, the edge entity may apply a round robin approach in selecting an entity to handle the request. Advantageously, these techniques assist in preserving thermal properties of multiple edge entities (e.g., edge clouds or other edge network environments) maintained by individual service providers that service FaaS function execution requests. By encouraging optimization thermal properties through the disclosed techniques, power usage by the edge resources of an entity may be reduced.

Figure 2:
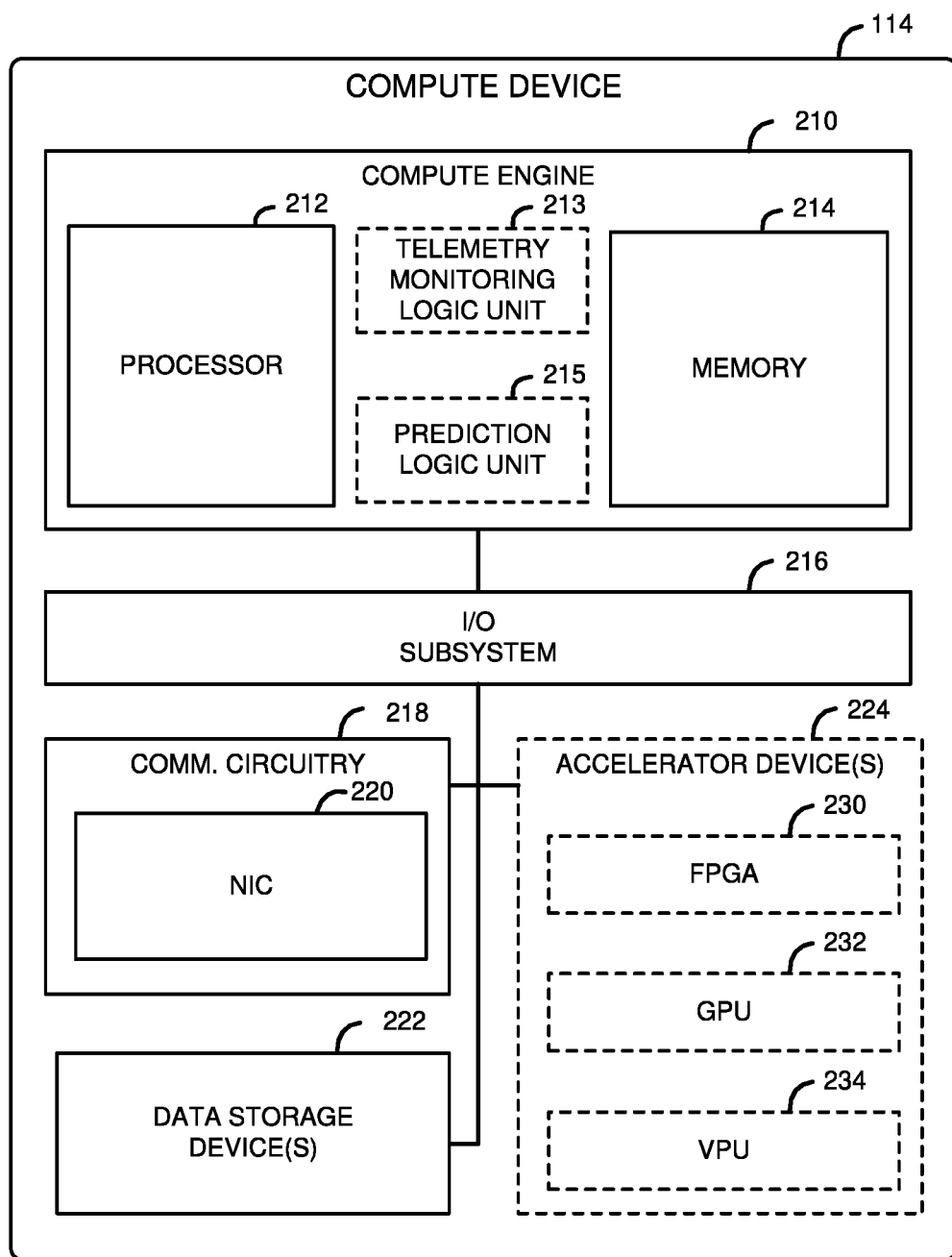
FIG. 2 is a simplified block diagram of at least one embodiment of an edge resource device, such as a compute device, that may be included in the system described relative to FIG. 1.

Referring now to FIG. 2, a simplified block diagram of an edge resource device (also referred to herein as an "edge entity device") 200, such as a network gateway device of one of the service providers 120, 122, 124 of FIG. 1 is shown. Although the device 200 is depicted relative to FIG. 2, the following description of components discussed may also apply to those of other hardware devices of system 100. The illustrative device 200 includes a compute engine (also referred to herein as "compute engine circuitry") 210, an input/output (I/O) subsystem 216, communication circuitry 218, and one or more data storage devices 222. Further, as described herein, the device 200 may also include one or more accelerator devices 224. Of course, in other embodiments, the device 200 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a telemetry monitoring logic unit 213, a memory 214, and a prediction logic unit 215. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

The telemetry monitoring logic unit 213 may be embodied as any device or circuitry to monitor telemetry data obtained for components in the edge platform, such as those of the edge resources 150, 152, 154. For example, the telemetry monitoring logic unit 213 may be configured to obtain ambient sensor data from sensors configured on each of the edge resources 150, 152, 154, such as sensors for temperature, load, capacity, and the like. The telemetry monitoring logic unit 213 is also configured to manage thermal telemetry data relative to a SLA associated with the edge resources 150, 152, 154, such as determine whether to execute a FaaS function on a given edge resource or to forward an underlying request to another edge entity. The prediction logic unit 215 may be embodied as any device or circuitry to generate and update predictive models trained by sensor data obtained by the telemetry monitoring logic unit 213 and determined analytics derived from the sensor data, including historical metrics (e.g., for temperature over time). As stated, the predictive models may be used to estimate thermal properties of the edge resources for a given time period.

The compute engine 210 is communicatively coupled to other components of the device 200 via the I/O subsystem 216, which may be embodied as circuitry and/or components to facilitate input/output operations with the compute engine 210 (e.g., with the processor 212 and/or the memory 214) and other components of the device 200. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the device 200, into the compute engine 210.

The communication circuitry 218 may be embodied as any communication circuit, device, or collection thereof, capable of enabling communications over a network between the device 200 and another device (e.g., the edge device 110, the edge resources 150, 152, 154, devices in the core data center 190, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the device 200 to connect with another compute device (e.g., the edge device 110, the edge resources 150, 152, 154, devices in the core data center 190, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the device 200 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations (e.g., machine learning and artificial intelligence (AI) operations) faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision. In some embodiments, the device 200 may be embodied as one or more physical compute devices or a virtualized system (e.g., one or more functions executed in a virtualized environment(s), such as virtual machine(s) or container(s), in which the underlying hardware resources appear as physical hardware to software executing in the virtualized environment(s), but are separated from the software by an abstraction layer).

The edge resources 150, 152, 154 (e.g., other compute devices 160, 162, 164, 166, 168, 170), the edge device 110, the edge nodes 180, and devices in the core data center 190 may have components similar to those described in FIG. 2 with reference to the device 200. The description of those components of the device 200 is equally applicable to the description of components of the edge resources 150, 152, 154 (e.g., compute devices 160, 164, 168 and accelerator devices 162, 166, 170), the edge device 110, the edge nodes 180, and devices in the core data center 190. Further, it should be appreciated that any of the edge resources 150, 152, 154 (e.g., compute devices 160, 164, 168 and accelerator devices 162, 166, 170), the edge device 110, the device 200, the edge nodes 180, and the devices in the core data center 190 may include other components, sub-components, and devices commonly found in a computing device, which are not discussed above in reference to the device 200 and not discussed herein for clarity of the description. Further, it should be understood that one or more components of a compute device may be distributed across any distance, and are not necessarily housed in the same physical unit.

The device 200, edge resources 150, 152, 154 (e.g., compute devices 160, 164, 168 and accelerator devices 162, 166, 170), the edge device 110, the edge nodes 180, and the core data center 190 are illustratively in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), optical networks, or any combination thereof.

Figure 3:
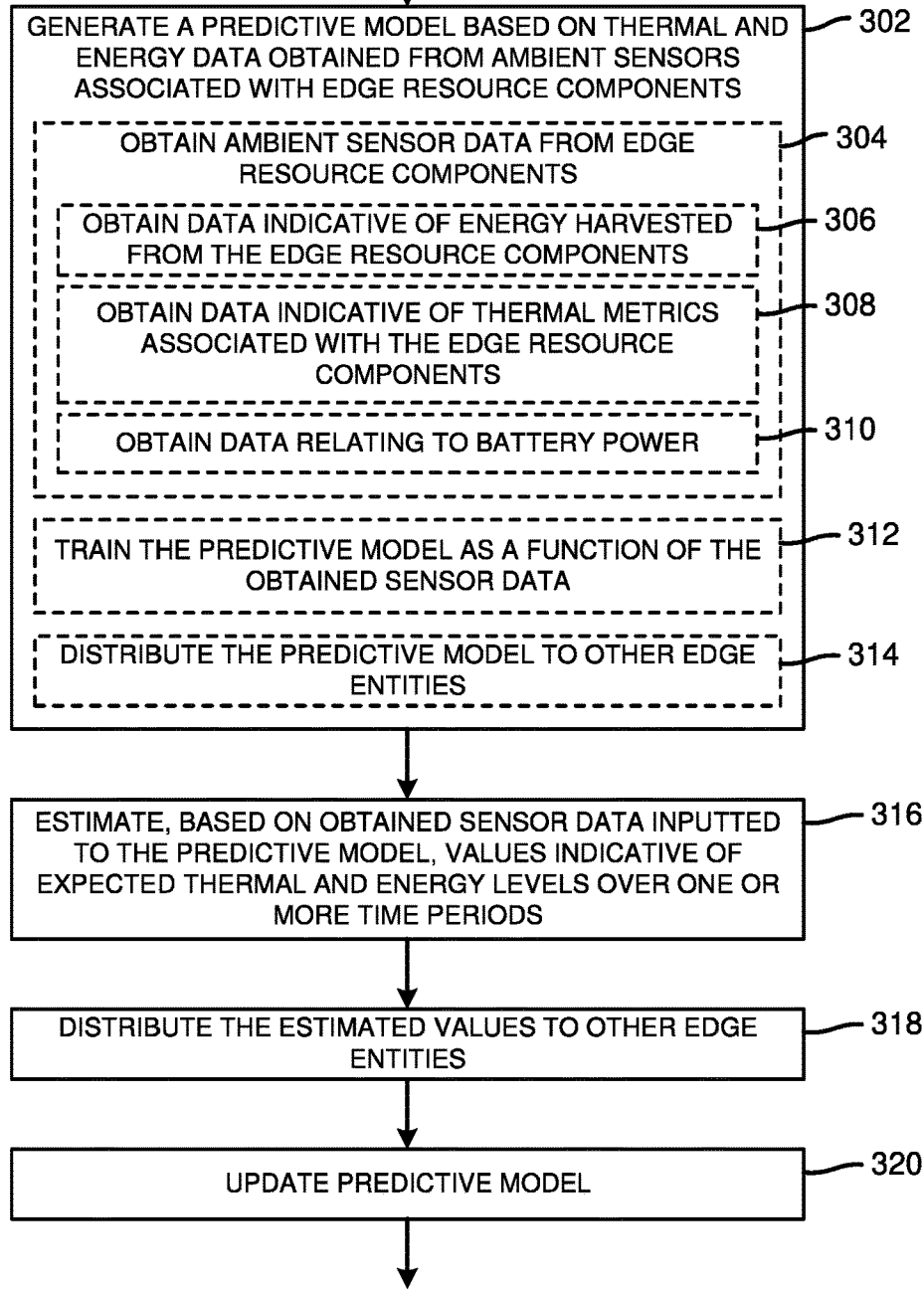
FIG. 3 is a simplified flow diagram of at least one embodiment of a method that may be performed by a device of FIGS. 1 and 2 for predicting thermal and energy usage for resources within an edge network.

Referring now to FIG. 3, a device in the system 100, such as the device 200, in operation, performs a method 300 for predicting thermal and energy properties of an edge entity (e.g., an edge network maintained by a given service provider 120, 122, 124). In this example, the method 300 may be carried out by the device 200 in a V2V or V2X system communication architecture. As shown, the method 300 begins in block 302, in which the device 200 generates a predictive model based on thermal and energy data obtained from ambient sensors associated with edge resource components (e.g., ambient sensors 172, 174, 176, or edge resources 150, 152, 154, respectively). More particularly, in block 304, the device 200 may obtain the ambient sensor data from the edge resource components. To do so, the device 200 may enable a telemetry monitor to obtain such data from ambient sensors configured on the edge resources. Various types of thermal and energy data may be obtained. For instance, in block 306, the device 200 may obtain data indicative of energy harvested from edge resource components, such as in the case of edge resource components powered by solar energy. As another example, in block 308, the device 200 may obtain data indicative of thermal metrics (e.g., temperature, humidity, cooling rate) associated with the edge resource components. As yet another example, in block 310, the device 200 may obtain data indicative of battery power of the edge resource components. In addition to the aforementioned input, the device 200 may also collect (or derive from the collected data) analytics pertaining to other thermal properties of the underlying edge resource components, such as historical temperature values over time, cooling capacity, and so on.

Further, in block 312, the device 200 may train the predictive model as a function, in part, of the obtained sensor data (and any additional collected or derived thermal data collected by the device 200). The device 200 may utilize a variety of machine learning and predictive modeling techniques to do so, such as neural networks, Naïve Bayes, k-nearest techniques, and the like. The device 200 may also include other data in training the predictive model, such as a present load of the edge resources and observed latencies and the additional thermal data. In addition, the device 200 may also train the predictive model as a function of internal sensor data within the device 200. Further, the device 200 may also train the predictive model using sensor data provided by peer base stations or other edge entities, including sensor data obtained by edge resources of those entities. Further still, the device 200 may also train the predictive model using sensor data captured by devices associated with the network infrastructure (e.g., road sensors). Once generated, the device 200 may store the predictive model thereon or send the model to a server hosted by the edge entity. In addition, in block 314, the device 200 may distribute the predictive model to other edge entities on the edge platform.

In block 316, the device 200 may estimate, based on subsequently obtained sensor data inputted to the predictive model (and any additional thermal data including a current cooling capacity, current thermal load, historical temperature, etc.), one or more values indicative of expected thermal and energy levels or properties over one or more time periods. More particularly, the device 200 may obtain data from respective ambient sensors and input the data to the generated predictive model. As additional input, the device 200 may provide a parameter of a time period (e.g., the next thirty minutes, the next hour, next six hours, next twelve hours, and so on). The predictive model may output an estimate of properties such as an expected temperature of edge resource components, humidity, an amount of harvested energy available, over that specified time period. In block 318, the device 200 may distribute the estimated thermal and energy levels to other edge entities in the edge platform. In block 320, the device 200 may update the predictive model with the subsequently obtained data.

Figure 4:
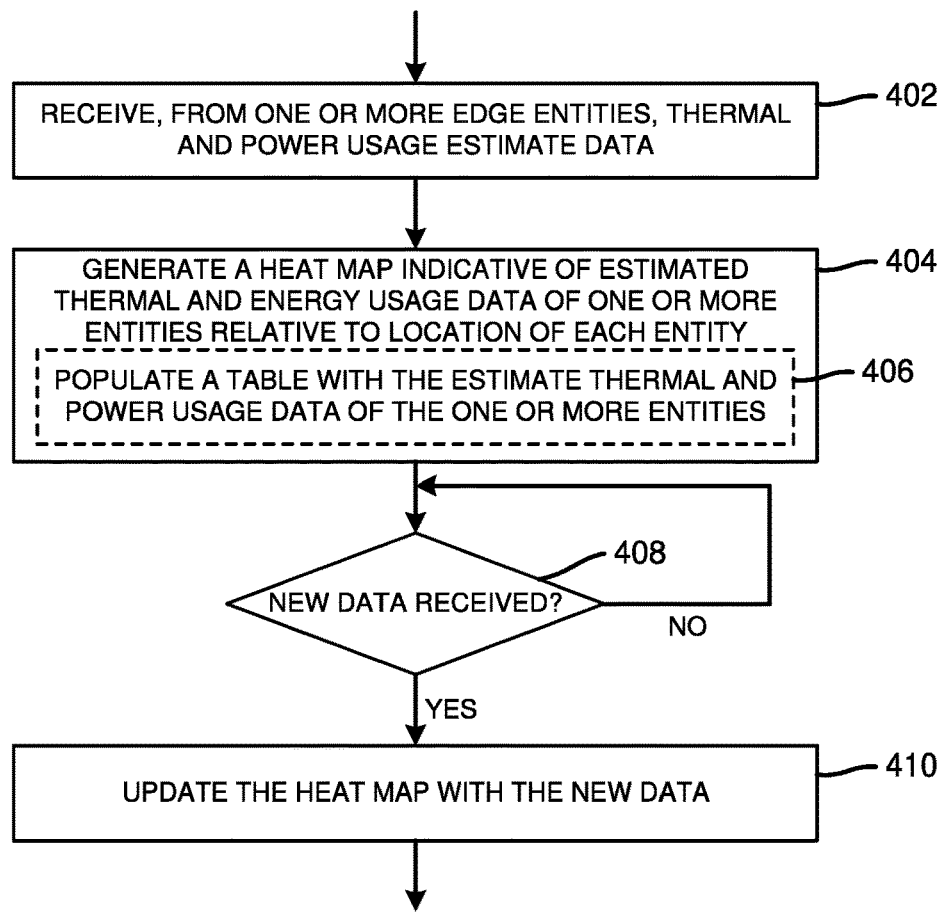
FIG. 4 is a simplified flow diagram of at least one embodiment of a method that may be performed by the device of FIGS. 1 and 2 for generating a heat map of edge entities indicative of thermal and energy data for each edge entity.

Each of the edge entities may distribute respective thermal and energy estimates to one another. Referring now to FIG. 4, a device in the system 100, such as the device 200, in operation, performs a method 400 for building a geographical heat map of edge entities based on the distributed respective thermal and energy estimates. As shown, the method 400 begins in block 402, in which the device 200 receives thermal and energy estimates from each of the edge entities. In block 404, the device 200 generates the heat map that includes the received thermal and energy estimates. The heat map may also include relative locations of each entity. For instance, to do so, the device 200 may populate a table in memory that includes each edge entity of the platform, estimated thermal properties, energy levels, and locations, as indicated in block 406.

In operation, the device 200 may receive periodic updates to estimated thermal and energy. In block 408, the device 200 determines whether updated data is received. If not, then the method 400 may loop until received. Otherwise, if new data is received, in block 410, the device 200 updates the heat map with the new data.

Figure 5:
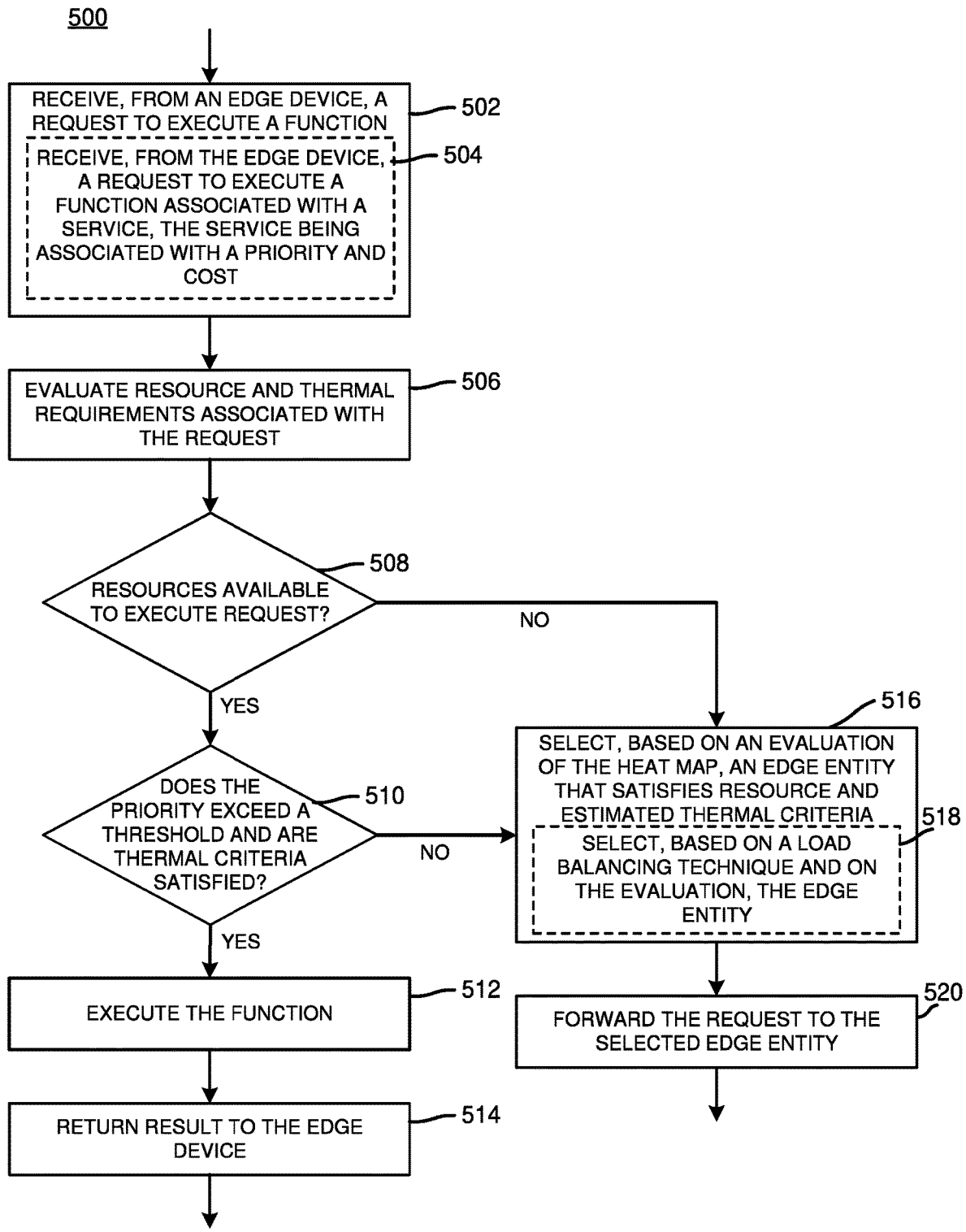
FIG. 5 is a simplified flow diagram of at least one embodiment of a method that may be performed by the compute device of FIGS. 1 and 2 for managing a request from an edge device to execute a function-as-a-service function.

Referring now to FIG. 5, an edge entity device in the system 100, such as the device 200, in operation, performs a method 500 for managing FaaS function requests based on estimated thermal properties across edge entities. As shown, the method 500 begins in block 502, in which the device 200 receives, from an edge device, a request to execute a function. The edge device may be in a location proximate to the underlying edge network environment. Further, in the block 504, the device 200 may receive the request, in which the request is to execute a function associated with a service. For example, assume that the request originates from an edge device and is for an object recognition service. The service may be associated with a SLA and specify a priority and a cost.

In block 506, the device 200 may determine thermal requirements associated with the request. For instance, to do so, the device 200 may evaluate the underlying service and identify resources required by the edge entity to execute the function. The device 200 may correlate an amount of thermal output and energy required to execute the function relative to other processes executing by the edge entity within a time period specified in the request.

In block 508, the device 200 determines whether the edge entity has available resources to execute the request. To do so, the device 200 may evaluate a current allocation of the underlying edge resources, as well as one or more other characteristics associated with the edge entity, such as current cooling capacity. If resources are available, then the method 500 proceeds to block 510, in which the device 200 determines whether thermal properties of the edge entity satisfy the request. To do so, the device 200 may evaluate the previously determined predicted thermal properties and energy levels to determine whether the device 200 has thermal capabilities available to handle the request at the specified time.

If either blocks 508 or 510 result in the negative (i.e., either resources are not available or thermal and power criteria are not satisfied), then the method 500 proceeds to block 516, in which the device 200 selects, based on an evaluation of the previously generated heat map, an edge entity that satisfies the resource requirements and thermal and power criteria. Further, in block 518, the device 200 may select the edge entity based on a load balancing technique (e.g., a round robin technique) and on the evaluation. Other factors may include geographic location. In block 520, the device 200 forwards the request to the selected edge entity. If the device 200 determines that the edge entity has available resources and satisfies thermal and power criteria, the device 200 may carry out the function using the edge resources, as indicated in block 512. In block 514, the device 200 may return the result of the executed function to the edge device.

Figure 6:
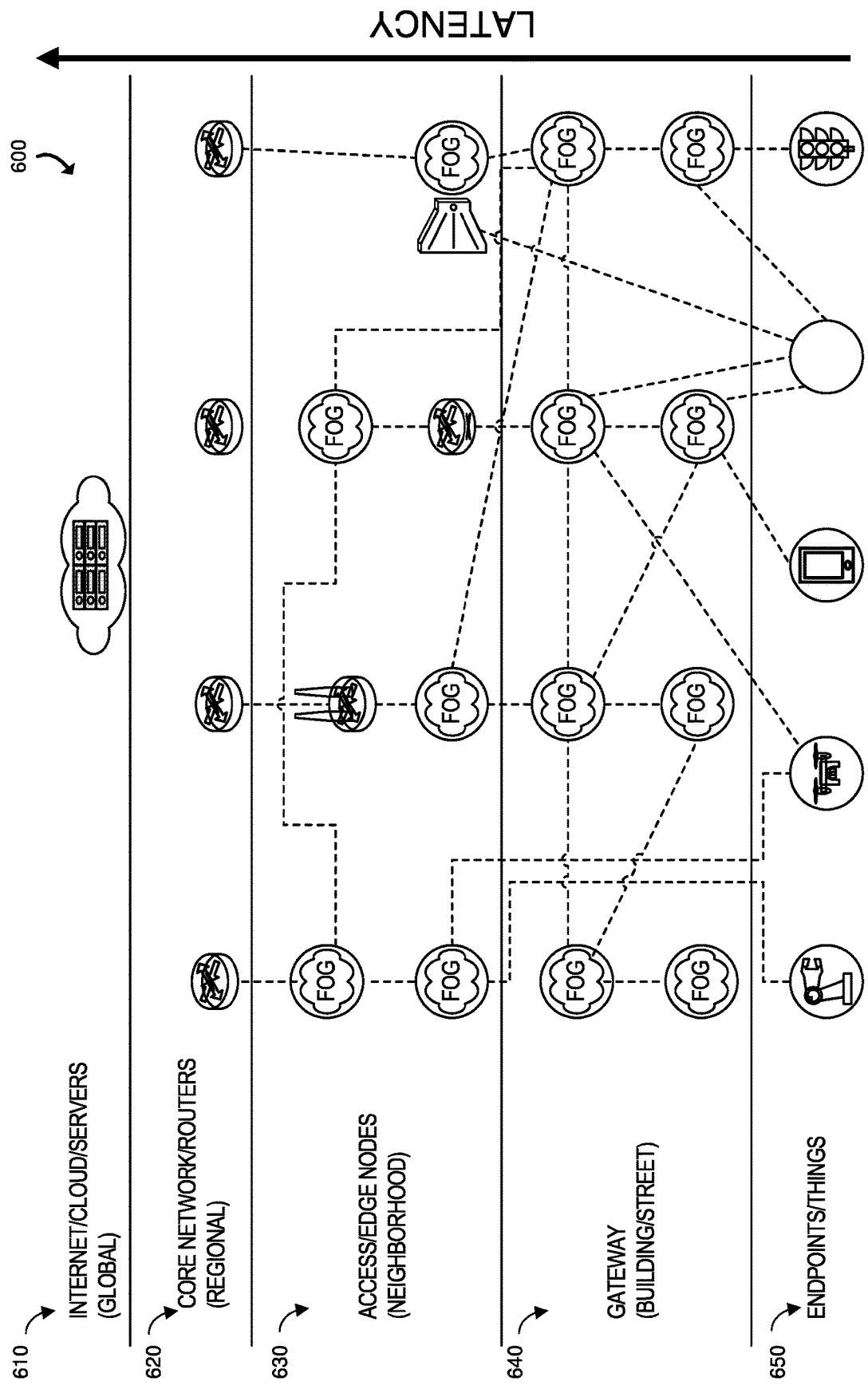
FIG. 6 is a simplified block diagram of a fog and mobile edge computing (MEC) network topology that may be utilized with the system of FIG. 1.

Referring briefly to FIG. 6, a MEC and fog network topology 600 is shown. The network topology 600 includes endpoints (at an endpoints/things network layer 650), gateways (at a gateway layer 640), access or edge computing nodes (e.g., at neighborhood nodes layer 630), core network or routers (e.g., at a regional or central office layer 620). A fog network (e.g., established at the gateway layer 640) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE or 5G core network), among others. In this context, FIG. 6 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes. Further, although FIG. 6 describes the MEC architecture, one of skill in the art will recognize that the embodiments presented herein may be adapted to a variety of systems, such as network infrastructures that service V2V or V2X systems.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may be implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may be applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes an edge entity device in an edge network environment comprising a plurality of edge entities, the edge entity device comprising circuitry to receive, from an edge device in the edge network environment, a request to execute a function; evaluate thermal and power criteria associated with the request; determine, as a function of a predicted thermal output over a specified time period relative to the thermal and power criteria, whether to execute the function; in response to a determination to not execute the function, select an edge entity of the plurality of edge entities that is able to satisfy the thermal and power criteria; and forward the request to the selected edge entity.

Example 2 includes the subject matter of Example 1, and wherein to receive the request to execute the function comprises to receive a request to execute a function of a service, wherein the service is associated with a priority and a cost of execution according to a service level agreement.

Example 3 includes the subject matter of any of Examples 1 and 2, and wherein to determine whether to execute the function further comprises to determine, based on the priority, whether to execute the function.

Example 4 includes the subject matter of any of Examples 1-3, and wherein the circuitry is further to generate a predictive model based on thermal and energy data obtained from ambient sensors associated with edge resource components of the edge network environment and on historical sensor data associated with edge resource components.

Example 5 includes the subject matter of any of Examples 1-4, and wherein to generate the predictive model comprises to obtain ambient sensor data from the edge resource components; and train the predictive model as a function of the obtained sensor data.

Example 6 includes the subject matter of any of Examples 1-5, and wherein to obtain the ambient sensor data from the edge resource components comprises to obtain data indicative of at least one of an energy harvested from the edge resource components, thermal metrics associated with the edge resource components, and battery power associated with the edge resource components.

Example 7 includes the subject matter of any of Examples 1-6, and wherein to train the predictive model comprises to train the predictive model based on data originating from peer base stations and infrastructure sensors, wherein the circuitry is further to distribute the predictive model to each of the plurality of edge entities.

Example 8 includes the subject matter of any of Examples 1-7, and wherein the circuitry is further to estimate, based on data subsequently obtained from the ambient sensors, the predicted thermal output over the specified time period.

Example 9 includes the subject matter of any of Examples 1-8, and wherein to estimate the predicted thermal output comprises to estimate values indicative of expected thermal output and energy levels over the specified time period.

Example 10 includes the subject matter of any of Examples 1-9, and wherein the circuitry is further to distribute the estimated predicted thermal output to each of the plurality of edge entities.

Example 11 includes one or more machine-readable storage media storing a plurality of instructions, which, when executed, cause an edge entity device in an edge network environment comprising a plurality of edge entities to receive, from an edge device in the edge network environment, a request to execute a function; evaluate thermal and power criteria associated with the request; determine, as a function of a predicted thermal output over a specified time period relative to the thermal and power criteria, whether to execute the function; in response to a determination to not execute the function, select an edge entity of the plurality of edge entities that is able to satisfy the thermal and power criteria; and forward the request to the selected edge entity.

Example 12 includes the subject matter of Example 11, and wherein to receive the request to execute the function comprises to receive a request to execute a function of a service, wherein the service is associated with a priority and a cost of execution according to a service level agreement.

Example 13 includes the subject matter of any of Examples 11 and 12, and wherein to determine whether to execute the function further comprises to determine, based on the priority, whether to execute the function.

Example 14 includes the subject matter of any of Examples 11-13, and wherein the plurality of instructions further causes the device to generate a predictive model based on thermal and energy data obtained from ambient sensors associated with edge resource components of the edge network environment and on historical sensor data associated with edge resource components.

Example 15 includes the subject matter of any of Examples 11-14, and wherein to generate the predictive model comprises to obtain ambient sensor data from the edge resource components; and train the predictive model as a function of the obtained sensor data.

Example 16 includes the subject matter of any of Examples 11-15, and wherein to obtain the ambient sensor data from the edge resource components comprises to obtain data indicative of at least one of an energy harvested from the edge resource components, thermal metrics associated with the edge resource components, and battery power associated with the edge resource components.

Example 17 includes the subject matter of any of Examples 11-16, and wherein the plurality of instructions further causes the device to estimate, based on data subsequently obtained from the ambient sensors, the predicted thermal output over the specified time period.

Example 18 includes the subject matter of any of Examples 11-17, and wherein to estimate the predicted thermal output comprises to estimate values indicative of expected thermal output and energy levels over the specified time period.

Example 19 includes the subject matter of any of Examples 11-18, and wherein the plurality of instructions further causes the device to distribute the estimated predicted thermal output to each of the plurality of edge entities.

Example 20 includes an edge entity device comprising circuitry for receiving, from an edge device in an edge network environment comprising a plurality of edge entities, a request to execute a function; means for evaluating thermal and power criteria associated with the request; means for determining, as a function of a predicted thermal output over a specified time period relative to the thermal and power criteria, whether to execute the function; means for, in response to a determination to not execute the function, selecting an edge entity of the plurality of edge entities that is able to satisfy the thermal and power criteria; and circuitry for forwarding the request to the selected edge entity.

What is claimed is:

1. An edge entity device in an edge network environment including a plurality of edge entities, the edge entity device comprising:
   circuitry to:
      obtain ambient sensor data from edge resource components, the ambient sensor data indicative of at least one of an energy harvested from the edge resource components, thermal metrics associated with the edge resource components, or battery power associated with the edge resource components;
      generate a predictive model based on thermal and energy data obtained from ambient sensors associated with the edge resource components of the edge network environment and on historical sensor data associated with edge resource components, the generating of the predictive model including training the predictive model as a function of the obtained sensor data and the historical sensor data associated with the edge resource components;
      receive, from an edge device in the edge network environment, a request to execute a function;
      evaluate thermal and power criteria associated with the request;
      determine, as a function of a predicted thermal output over a specified time period relative to the thermal and power criteria, whether to execute the function;
      in response to a determination to not execute the function, select an edge entity of the plurality of edge entities that is able to satisfy the thermal and power criteria; and
      forward the request to the selected edge entity.

2. The edge entity device of claim 1, wherein to receive the request to execute the function, the circuitry is to receive a request to execute a function of a service, wherein the service is associated with a priority and a cost of execution according to a service level agreement.

3. The edge entity device of claim 2, wherein to determine whether to execute the function, the circuitry is to determine, based on the priority, whether to execute the function.

4. The edge entity device of claim 1, wherein to train the predictive model, the circuitry is to train the predictive model based on data originating from peer base stations and infrastructure sensors, wherein the circuitry is further to distribute the predictive model to each of the plurality of edge entities.

5. The edge entity device of claim 1, wherein the circuitry is further to estimate, based on data subsequently obtained from the ambient sensors, the predicted thermal output over the specified time period.

6. The edge entity device of claim 5, wherein to estimate the predicted thermal output, the circuitry is to estimate values indicative of expected thermal output and energy levels over the specified time period.

7. The edge entity device of claim 6, wherein the circuitry is further to distribute the estimated predicted thermal output to each of the plurality of edge entities.

8. One or more non-transitory machine-readable storage media comprising a plurality of instructions, which, when executed, cause an edge entity device in an edge network environment including a plurality of edge entities to:
   obtain ambient sensor data from edge resource components, the ambient sensor data indicative of at least one of an energy harvested from the edge resource components, thermal metrics associated with the edge resource components, or battery power associated with the edge resource components;
   generate a predictive model based on thermal and energy data obtained from ambient sensors associated with the edge resource components of the edge network environment and on historical sensor data associated with edge resource components, the generating of the predictive model including training the predictive model as a function of the obtained sensor data and the historical sensor data associated with the edge resource components;
   receive, from an edge device in the edge network environment, a request to execute a function;
   evaluate thermal and power criteria associated with the request;
   determine, as a function of a predicted thermal output over a specified time period relative to the thermal and power criteria, whether to execute the function;
   in response to a determination to not execute the function, select an edge entity of the plurality of edge entities that is able to satisfy the thermal and power criteria; and
   forward the request to the selected edge entity.

9. The one or more non-transitory machine-readable storage media of claim 8, wherein the plurality of instructions, when executed, cause the edge entity device to receive the request to execute the function by executing a function of a service, wherein the service is associated with a priority and a cost of execution according to a service level agreement.

10. The one or more non-transitory machine-readable storage media of claim 9, wherein the plurality of instructions, when executed, cause the edge entity device to determine whether to execute the function based on the priority.

11. The one or more non-transitory machine-readable storage media of claim 8, wherein the plurality of instructions, when executed, cause the edge entity device to estimate, based on data subsequently obtained from the ambient sensors, the predicted thermal output over the specified time period.

12. The one or more non-transitory machine-readable storage media of claim 8, wherein the plurality of instructions, when executed, cause the edge entity device to estimate the predicted thermal output by estimating values indicative of expected thermal output and energy levels over the specified time period.

13. The one or more non-transitory machine-readable storage media of claim 12, wherein the plurality of instructions, when executed, cause the edge entity device to distribute the estimated predicted thermal output to each of the plurality of edge entities.

* * * * *